(12) United States Patent
Adachi et al.

(10) Patent No.: US 6,693,272 B2
(45) Date of Patent: Feb. 17, 2004

(54) LIGHT PATH DEVIATION DETECTING APPARATUS AND CONFOCAL MICROSCOPE

(75) Inventors: Akira Adachi, Sagamihara (JP); Tadashi Uchida, Yokohama (JP); Mikio Aoshima, Yokohama (JP)

(73) Assignee: Nikon Corporation, Tokyo (JP)

( * ) Notice: Subject to any disclaimer, the term of this patent is extended or adjusted under 35 U.S.C. 154(b) by 262 days.

(21) Appl. No.: 09/799,731

(22) Filed: Mar. 7, 2001

(65) Prior Publication Data

US 2001/0022341 A1 Sep. 20, 2001

(30) Foreign Application Priority Data

Mar. 8, 2000 (JP) .................................. 2000-063984
Apr. 27, 2000 (JP) .................................. 2000-127242

(51) Int. Cl.[7] .................. G02B 21/06; G02B 27/00; G01B 11/26
(52) U.S. Cl. ............... 250/216; 356/139.07; 356/153; 359/368; 372/9
(58) Field of Search .................. 250/216, 201.1–201.3; 365/139.04, 139.05, 139.07, 141.2, 152.1, 153, 399, 400; 359/368, 383, 385, 386, 389; 372/9, 14, 15, 29.02, 33, 107

(56) References Cited

U.S. PATENT DOCUMENTS

| | | | | |
|---|---|---|---|---|
| 4,801,791 A | * | 1/1989 | Cain | 250/201 |
| 5,121,405 A | * | 6/1992 | Negus | 372/107 |
| 5,192,980 A | * | 3/1993 | Dixon et al. | 356/326 |
| 5,847,867 A | * | 12/1998 | Sugiyama et al. | 359/368 |
| 5,923,418 A | * | 7/1999 | Clark et al. | 356/153 |
| 6,108,127 A | * | 8/2000 | Atkinson | 359/389 |

OTHER PUBLICATIONS

Patent Abstracts of Japan, Optical Axis Deviation Correcting Device and Scan Type Optical Microscope, Jul. 31, 1998, Ri Masa, et al.

* cited by examiner

Primary Examiner—Gerard R. Strecker

(57) ABSTRACT

A light path deviation detecting apparatus has a diverging element for diverging a detection target light path into two light paths, and detects light receiving position on light receiving surfaces disposed spaced light path lengths different from each other in the diverged light paths. A tilt of the detection target light path is detected from the light receiving positions detected respectively.

12 Claims, 12 Drawing Sheets

LIGHT PATH DEVIATION DETECTING APPARATUS AND CONFOCAL MICROSCOPE

This application claims the benefit of Japanese Patent applications Nos. 2000-063984 and 2000-127242 which are hereby incorporated by reference.

BACKGROUND OF THE INVENTION

1. Field of the Invention

The present invention relates to a light path deviation detecting apparatus for detecting deviations (shift and tilt) of a detection target light path, and to a confocal microscope mounted with this light path deviation detecting apparatus.

2. Related Background Art

A confocal microscope is superior to a general microscope in terms of its resolution and other various performances, and is used widely in industrial and biological fields.

FIG. 7 is a diagram showing a laser scan type confocal microscope as this type of confocal microscope.

Referring to FIG. 7, a light source 11 emits linearly polarized laser beams. A beam expander 12 expands a beam diameter of the laser beam. The laser beam with the expanded beam diameter travels straight through a polarized beam splitter 13 and reaches a ¼ wavelength plate. The ¼ wavelength plate 14 transforms the laser beam into circularly polarized light and emits the same polarized light to a scan unit 15.

This scan unit 15 scans the laser beam in two-dimensional directions by use of a biaxial mirror drive mechanism. An objective lens 18 converges the scan light at an observation point on a sample 19.

The scan light reflected by the sample 19 becomes reversely circularly polarized light. The reversely circularly polarized light travels tracing back the objective lens 18 and the scan unit 15, and arrives at the ¼ wavelength plate 14.

The ¼ wavelength plate 14 transforms the circularly polarized light into rectilinearly polarized light of which the polarizing direction is orthogonal to the direction when illuminating, and emits the linearly polarized light to the polarized beam splitter 13. The polarized beam splitter 13 reflects the linearly polarized light. A condenser lens 21 converges the reflected linearly polarized light at a pinhole 23 of a light shielding plate 22. A photoelectric detecting device 24 receives the light penetrating this pinhole 23.

An A/D converter 25 converts an output of luminance of the photoelectric detecting device 24 into a digital signal.

A CPU 26 takes in the digital signal from the A/D converter 25 with a sampling clock synchronizing with the scan operation of the scan unit 15, and generates an image of the sample 19. This image is properly displayed on a display 27.

By the way, in this type of confocal microscope, an exit position and an exit angle of the laser beam fluctuates due to a change in characteristic of the light source and to a positional change of the internal optical element when switching a wavelength (in the case of the light source capable of switching the wavelength such as a titanium/sapphire laser).

FIG. 8A is a diagram showing a state drawn by a dotted line, wherein a shift occurs on the light path of the light source 11 for the reason given above. If such a shift occurs, the laser beam for the illumination deviates from a range of an entrance pupil 17 of an objective lens 18. As a result, a quantity of the illumination light upon the sample 19 decreases, resulting in an inconvenience such as a decrease in S/N ratio of the sample image.

Further, FIG. 8B shows a state indicated by a dotted line, wherein a tilt occurs in the light path of the light source 11. If such a tilt occurs, an illumination point on the sample 19 shifts. As a result, an observation point on the sample, which is in an optical conjugate relationship with the pinhole 23, is not sufficiently illuminated with the laser beam. Further, in the worst case, the converging position completely deviates from the pinhole 23 with the result that no image is obtained.

The prior art confocal microscope does not include a device for detecting the exit position and the exit angle of the laser beam. Therefore, the operator often continues to use the confocal microscope while being unaware of the above inconvenience. Further, the operator, even if aware of the inconvenience described above, must request a service center for maintenance each time because of providing no contrivance for precisely calibrating the light path deviation.

Moreover, some of the confocal microscopes have a plurality of light sources. In this type of confocal microscope having the plurality of light sources, it is difficult and intricate to adjust the laser beams of each light source exactly onto the same optical axis.

SUMMARY OF THE INVENTION

It is a primary object of the present invention, which was devised under such circumstances, to provide a light path deviation detecting apparatus capable of detecting light path deviation categorized distinctively into a shift or a tilt.

It is another object of the present invention to provide a light path deviation detecting apparatus capable of enhancing an accuracy of detecting the light path deviation by effectively reducing stray light generated inside.

It is still another object of the present invention to provide a confocal microscope capable of detecting light path deviations categorized distinctively into a shift or a tilt.

It is a further object of the present invention to provide a confocal microscope capable of automating correction of a deviation of an illumination light path.

It is still a further object of the present invention to provide a confocal microscope capable of easily executing calibrating the light paths of a plurality of light sources.

The light path deviation detecting apparatus and the confocal microscope, which accomplishes the above object, will hereinafter be described in a way of giving the corresponding components the same numerals as those in the embodiment. Note that the corresponding components are given herein for reference but do not any limitation to the present invention.

According to a first aspect of the present invention, as shown in FIG. 1, a light path deviation detecting apparatus for detecting a deviation of a detection target light path (which may be a light path deviation between, e.g., a fiducial light path and the detection target light path), comprises a diverging element (51, 52) for diverging the detection target light path into at least two light paths, and light detecting devices (53, 54, 55, 26), of which light receiving surfaces are disposed spaced light path lengths different from each other from respective diverging destinations of the diverging means, for detecting respectively light receiving positions on the light receiving surfaces. The light detecting devices detect a tilt of the detection target light path from a difference between the light receiving positions detected respectively by the light detecting devices.

FIG. 9 shows one example, wherein the light receiving surfaces of the light detecting devices are disposed spaced light path lengths different from each other from the respective diverging destinations. FIGS. 10A and 10B imaginarily show a state where the light receiving surfaces A, B shown in FIG. 9 are disposed equally on the detection target light path. The principle on the above geometry will hereinafter be explained by use of the imaginary light path shown in FIGS. 10A and 10B.

Referring first to FIG. 10A, a tilt (with an elevation angle θ, and a rotational angle ψ) occurs in the detection target light. This beam of detection target light reaches at first a light receiving position Pa of the light receiving surface A. Thereafter, the detection target light travels forward only a light path length difference ΔL in the direction (defined by the elevation angle θ and the rotary angle ψ), and arrives at a light receiving position Pb of the light receiving surface B.

Therefore, a deviation width between the two light receiving positions Pa and Pb is equal to (ΔL·tan θ). The light path length difference ΔL of these parameters is already known, and hence the elevation angle θ of the tilt can be obtained from the deviation width between the light receiving positions Pa and Pb. Further, the rotational angle ψ can be obtained directly from an inclined direction of the deviation.

Thus, the tilt of the detection target light path can be surely detected based on the difference between the light receiving positions of the respective diverging destinations. Further, the angle of the detection target light is adjusted so as to eliminate the difference between the light receiving positions (so that the light receiving positions may become coincident), thereby making it possible to correct the tilt of the detection target light.

On the other hand, referring to FIG. 10B, only a shift S occurs in the detection target light. The detection target light reaches at first the light receiving position Pa of the light receiving surface A. Thereafter, the detection target light travels in parallel with a reference optical axis, and arrives at the light receiving position PB of the light receiving surface B. In this case, the two light receiving positions Pa, Pb become coincident enough to cause no deviation. At this time, the shift S can be obtained directly from an absolute position of the light receiving position Pa (Pb). Further, the position of the detection target light is adjusted so that the light receiving position becomes coincident with an origin, whereby the shift of the detection target light can be also corrected.

According to a second aspect of the present invention, as shown in FIG. 3, a light path deviation detecting apparatus for detecting a deviation of a detection target light path, comprises diverging means (51, 52) for diverging the detection target light path into at least two light paths, light detecting devices (53, 54, 55, 26), of which light receiving surfaces are disposed at respective diverging destinations of the diverging means, for detecting respectively light receiving positions on the light receiving surfaces, and a light converging element (71), disposed at at least one diverging destination of the diverging means, for converging parallel beams of light with no occurrence of tilt at a predetermined position on the light receiving surface, wherein a tilt of the detection target light path is detected from a deviation of the light receiving position at the diverging destination provided with the light converging means from the predetermined position.

The principle of the above geometry will hereinafter be described with reference to FIGS. 11 and 12.

Referring first to FIG. 11, the tilt does not occur in the detection target light, and only the shift occurs. This sort of detection target light, of which the light path is deflected by the light converging element 2, reaches a predetermined position X on a light receiving surface Q. If a light receiving position P of the detection target light is thus coincident with the predetermined position X, it can be judged that the tilt does not occur in the detection target light.

While on the other hand, referring to FIG. 12, the tilt (defined by the elevation angle θ and the rotational angle ψ) occurs in the detection target light traveling through the light converging element 2. The detection target light arrives at a light receiving position P' on the light receiving surface Q regardless of the shift. A deviation width of this light receiving position P' from the predetermined position X is equal to F1·tan θ. F1 of these parameters corresponds to a distance (focal length) between a back or secondary principal point H of the light converging element and the light receiving surface Q, and is already known. Accordingly, the elevation angle θ of the tilt can be obtained from a value of this deviation width. Further, the rotational angle ψ can be obtained directly from the inclined angle of the deviation. The symbol H in FIG. 12 indicates the back or secondary principal point.

Thus, the tilt of the detection target light path can be surely detected based on the deviation of the light receiving position from the predetermined position. Further, the angle of the detection target light is adjusted so as to eliminate this deviation (so that the light receiving position may become coincident with the predetermined position), whereby the tilt of the detection target light can be also corrected. In this case, the predetermined position with which the light receiving position should be made coincident is a fixed point, and hence an advantage is that the correcting operation is more facilitated than in the first aspect of the present invention.

Moreover, the thus detected tilt is removed from the light receiving position at the other diverging destination, whereby the shift of the detection target light path can be also detected.

According to a third aspect of the present invention, as shown in FIGS. 13 and 14, in the light path deviation detecting apparatus according to the first or second aspect, the diverging means may include a stray light hindering device (112, 113, 118, 119) for hindering at least a part of stray light caused in the diverging means from reaching the light receiving surface of the light detecting device.

In the light path deviation detecting apparatus, the stray light might be generated when taking the light out of the detection target light path. The thus generated stray light reaches the light receiving surface at the diverging destination, wherein a false spot image 103 is formed (see FIG. 15a). If the false spot image 103 is formed, a centrobaric position 102 of a light distribution on the light receiving surface shifts, and therefore the light detecting device judges this centrobaric position 102 as an apparent spot image, and mis-detects the light receiving position. As a result, an accuracy of the light path deviation detecting apparatus declines.

By the way, if the type of the light source used herein is singular and this light source is fixed, the shift of the centrobaric position is constant each time, and hence the light detecting device is capable of comparatively easily correcting the shift of the light receiving position.

If the plurality of light sources are exchangeably used, however, an intensity ratio of normal light to the stray light and the position change due to slight differences between the layout positions of the light sources, between the wavelengths and between the polarizing directions, with the result that the centrobaric position of the light distribution on the light receiving surface shifts complicatedly. Therefore, the optical apparatus using exchangeably the plurality of light sources is quite difficult to precisely correct the shift of the light receiving position.

Such being the case, according to the geometry described above, the stray light hindering device is provided for hindering at least a part of the stray light from reaching the light receiving surface of the light detecting device. As a consequence, the influence of the false spot image disappears, and the accuracy of detecting the light path deviation can be exactly enhanced.

According to a fourth aspect of the present invention, in the light path deviation detecting apparatus according to the third aspect, the diverging means is a half-mirror obliquely provided on the detection target light path, and the stray reflected light hindering device includes an incidence restricting member (112) for hindering stray reflected light occurred in the half-mirror from entering a passing range of normal reflected light by restricting a passing range of incident light upon the half-mirror, and a reflection restricting member (113) for hindering the stray reflected light occurred in the half-mirror by restricting a passing range of the reflected light from the half-mirror.

According to this configuration, the incidence hindering member restricts the incidence range of the half-mirror, thereby hindering the stray reflected light from entering the passing light path of the normal reflected light. On the other hand, the reflection restricting member hinders directly the stray reflected light occurred by the half-mirror.

Accordingly, the stray reflected light can be certainly hindered on both of the incident and reflecting sides of the half-mirror.

According to a fifth aspect of the present invention, in the light path deviation detecting apparatus according to the third aspect, the diverging means is a half-mirror obliquely provided on the detection target light path, and the stray reflected light hindering device is constructed of a light shielding mask (118, 119) for masking the half-mirror, and has a front surface performing a function of hindering the stray reflected light occurred in the half-mirror from entering the passing range of the normal reflected light by restricting the passing range of the incident light upon the half-mirror, and a rear surface performing a function of hindering the stray reflected light occurred in the half-mirror by restricting the passing range of the reflected light from the half-mirror.

According to this configuration, the front surface of the light shielding mask functions to restrict the incidence range of the half-mirror. On the other hand, the rear surface (facing to the half-mirror) of the light shielding mask functions to restrict directly the stray reflected light occurred by the half-mirror. Accordingly, the stray reflected light can be certainly hindered on both of the incident and reflecting sides of the half-mirror.

According to a sixth aspect of the present invention, in the light path deviation detecting apparatus according to the fourth or fifth aspect, the stray reflected light hindering device sets a passing boundary of the reflected light in a "light path deviation between the normal reflected light and the stray reflected light" that occurs due to a thickness and a refractive index of the half-mirror. The beam of light entering the half-mirror is reflected by the two portions, i.e., the front surface and the rear surface of the half-mirror. One beam of light (normally exhibiting a larger light intensity) of these reflected beams of light turns out to be the normal reflected light, and the other becomes the stray reflected light. Therefore, a light path deviation with a fixed width proportional to the thickness of the half-mirror occurs between the normal reflected light and the stray reflected light. Then, the stray reflected light hindering device sets the boundary of the passing range of the reflected light within this light path deviation, thereby making is possible to selectively hinder the stray reflected light.

According to a seventh aspect of the present invention, as shown in FIG. 5, a confocal microscope comprises a light source (11) for illumination, an illumination optical system (12, 13, 14, 18) for irradiating a sample with the light from the light source, an observation optical system (13, 14, 18, 21) for converging the light reflected from the sample, a pinhole (23) disposed in an optical conjugate position through the observation optical system to an observation point on the sample, a scanning unit (15) for optically scanning the observation point over the sample, a light receiving element (24) for receiving the light penetrating the pinhole, and image forming unit (26) for forming an image of the sample from a relationship between a light intensity obtained from the light receiving element and the scanning operation of the scanning unit. The light path deviation detecting apparatus according to the first or second aspect is provided on an illumination light path of the illumination optical system and thus becomes capable of detecting a shift and a tilt of the illumination light path.

According to this architecture, the light path deviation detecting apparatus according to the first or second aspect is provided on the illumination light path of the confocal microscope. The deviation of this illumination light path leads to large declines of an image resolution and an image quality. Accordingly, this illumination light path is provided with the light path deviation detecting apparatus, whereby a decline of performance of the confocal microscope can be quickly surely detected. Further, it is also feasible to accurately easily execute a calibrating operation of the confocal microscope.

According to an eighth aspect of the present invention, as shown in FIG. 5, the confocal microscope according to the seventh aspect may further comprise a tilt control device (26, 81, 82, 85) for automatically correcting the tilt of the illumination light path by turning the illumination light path corresponding to the tilt of the illumination light path that is detected by the light path deviation detecting apparatus, and a shift control device (26, 83, 84) for automatically correcting the shift of the illumination light path by moving the illumination light path in parallel corresponding to the shift of the illumination light path that is detected by the light path deviation detecting apparatus.

According to this configuration, the confocal microscope is provided with the tilt control device and the shift control device. These control devices automatically correct the tilt and shift of the illumination light path on the basis of the result of detection of the light path deviation detecting apparatus. The deviation of the illumination light path is thus automatically corrected, thereby actualizing the highly reliable confocal microscope exhibiting a variety of stabilized performances such as the image resolution and the image quality.

According to a ninth aspect of the present invention, in the confocal microscope according to the seventh aspect, the light source includes plural types of selectable light sources (91, 92, 93), and the light path deviation detecting apparatus is disposed on the illumination light path common to the plural types of light sources, and has a calibrating device (100) capable of calibrating a light path deviation between the plural types of light sources while referring to a result of detection of the light path deviation detecting apparatus. In this confocal microscope, the light path deviation detecting apparatus is disposed on the illumination light path common to the plurality of light sources. Accordingly, the single unit of light path deviation detecting apparatus is capable of detecting the light path deviation with respect to the plurality of light sources.

DESCRIPTION OF THE PREFERRED EMBODIMENTS

Figure 1:
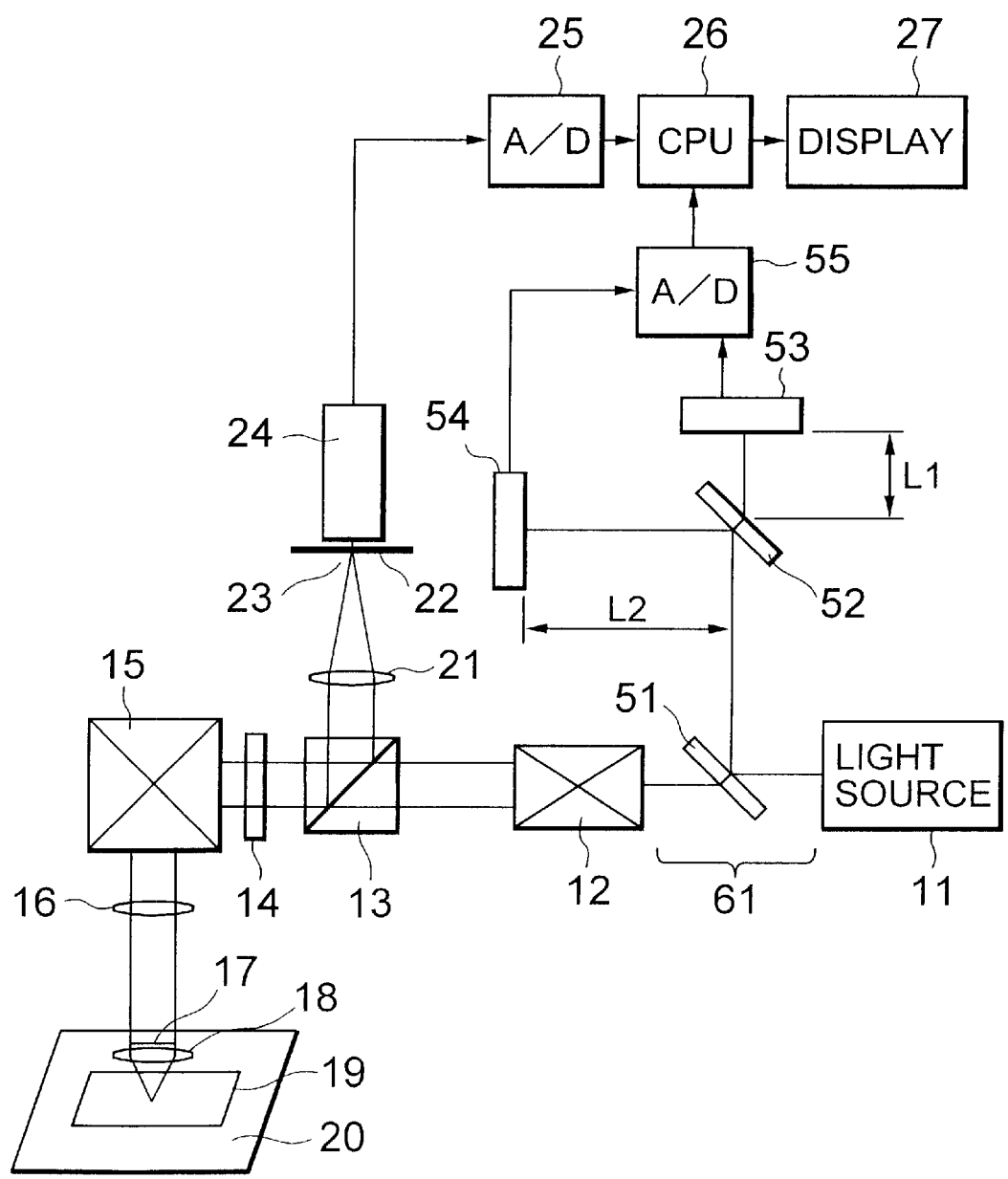
FIG. 1 is a diagram showing an architecture in a first embodiment of the present invention.
Figure 7:
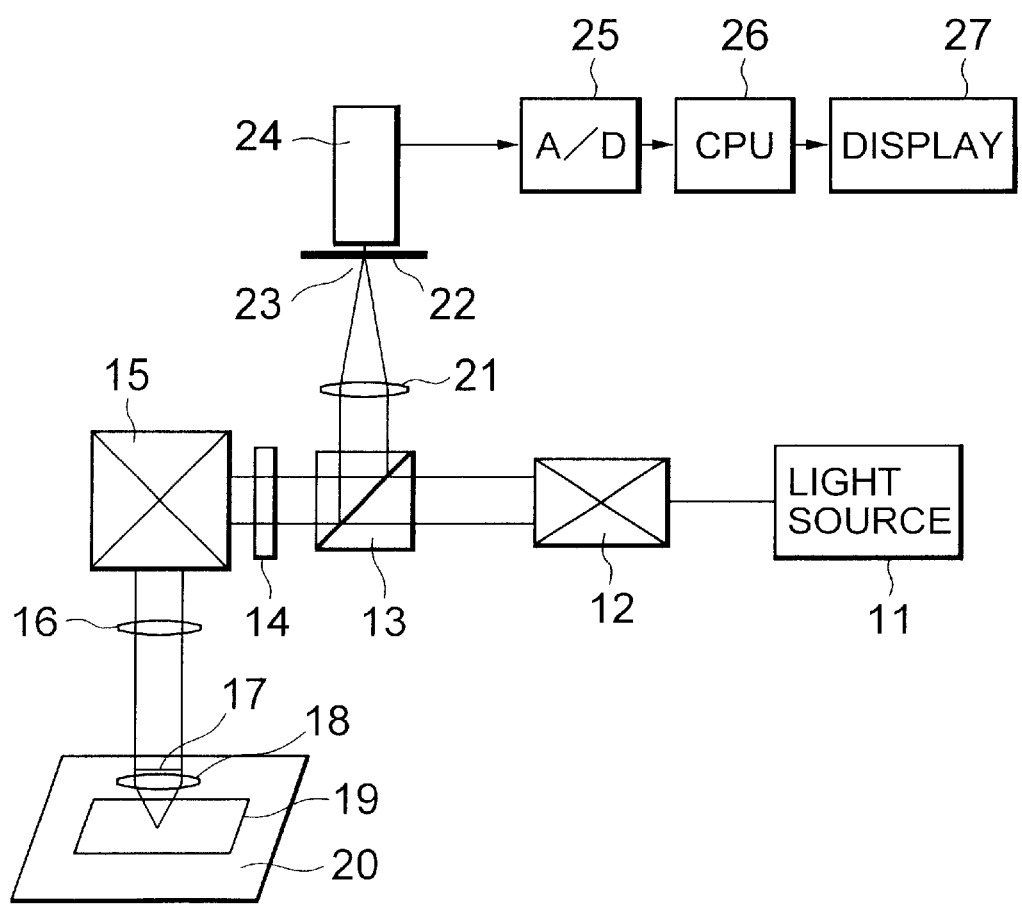
FIG. 7 is a diagram showing a confocal microscope in the prior art.
Figure 8A:
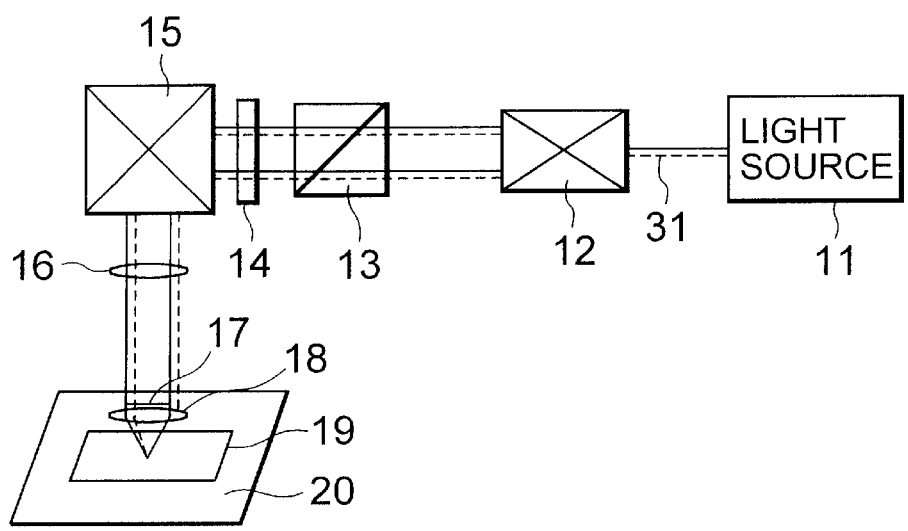
FIG. 8A is an explanatory diagram showing a trouble of the shift occurred as a light path deviation in the confocal microscope.
Figure 8B:
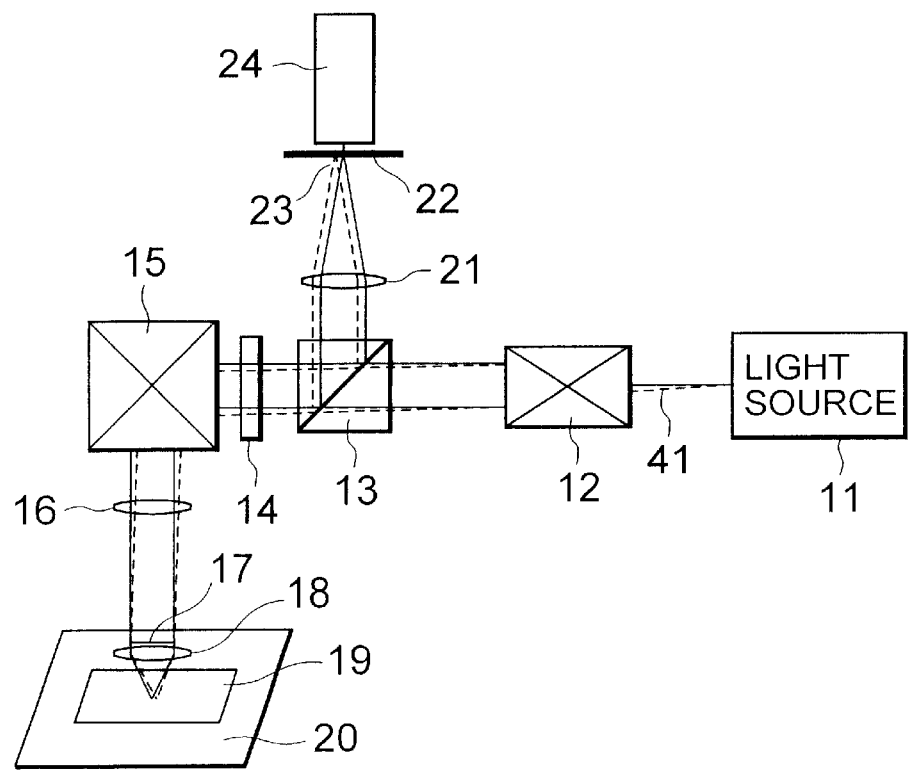
FIG. 8B is an explanatory diagram showing a trouble of the tilt occurred as a light path deviation in the confocal microscope.
Figure 9:
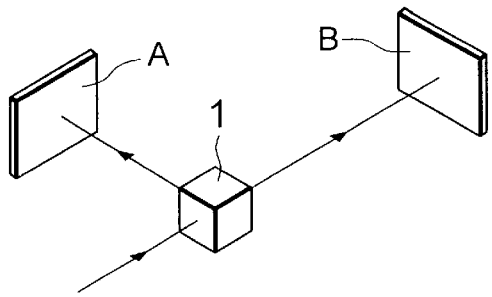
FIG. 9 is a diagram showing a layout relationship on a light receiving surface according to a first aspect of the present invention.
Figure 10A:
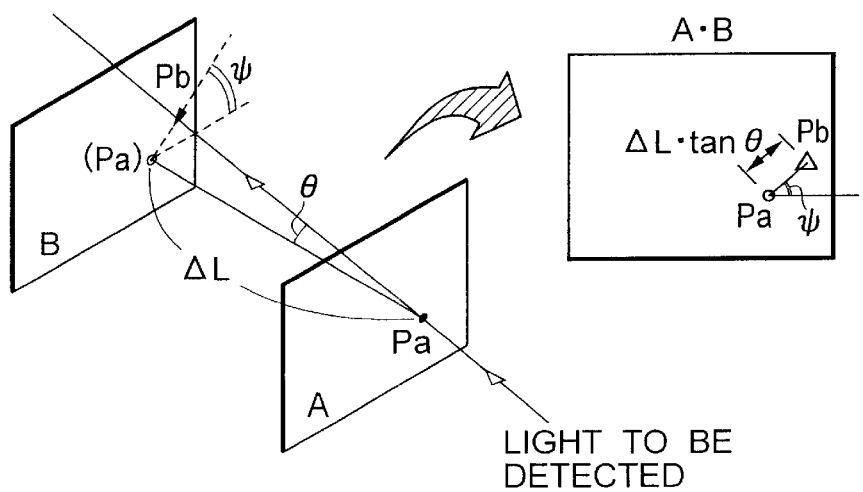
FIG. 10A is a diagram showing a tilt occurred when the light receiving surface is imaginarily disposed on a detection target light path.
Figure 10B:
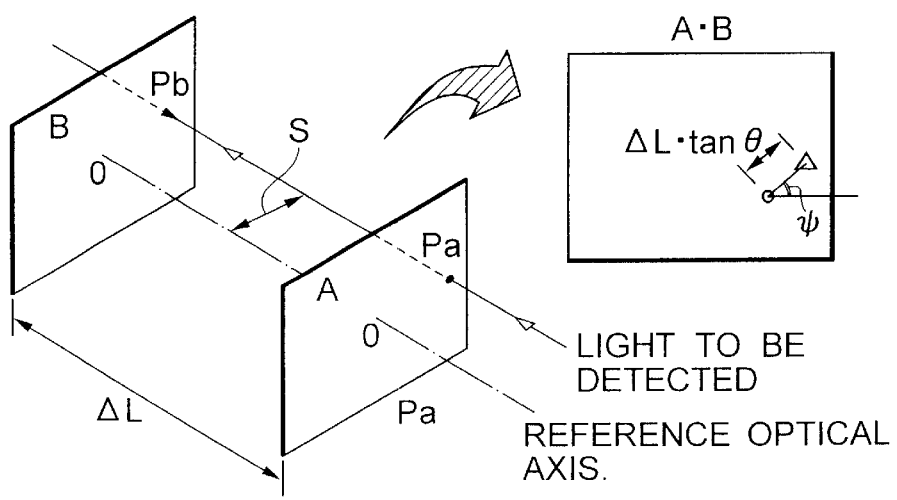
FIG. 10B is a diagram showing a shift occurred when the light receiving surface is imaginarily disposed on the detection target light path.
Figure 11:
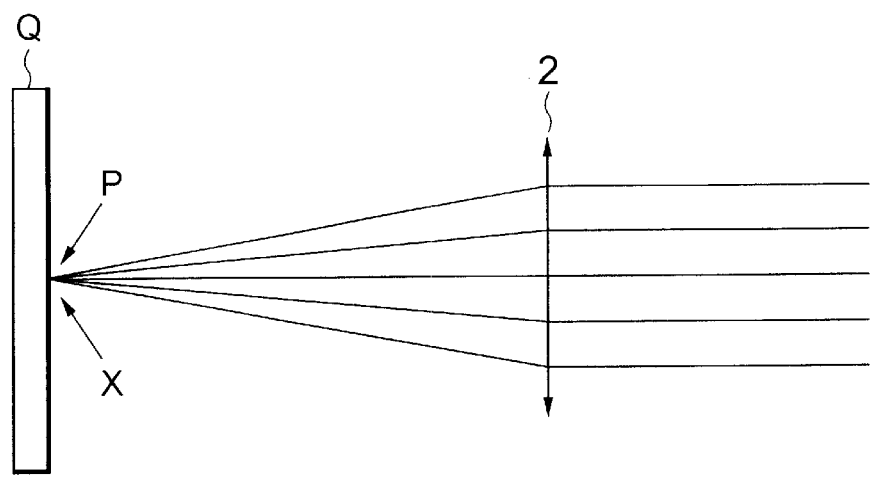
FIG. 11 is an explanatory diagram showing the shift detected by the light pat deviation detecting apparatus according to a second aspect of the present invention.
Figure 12:
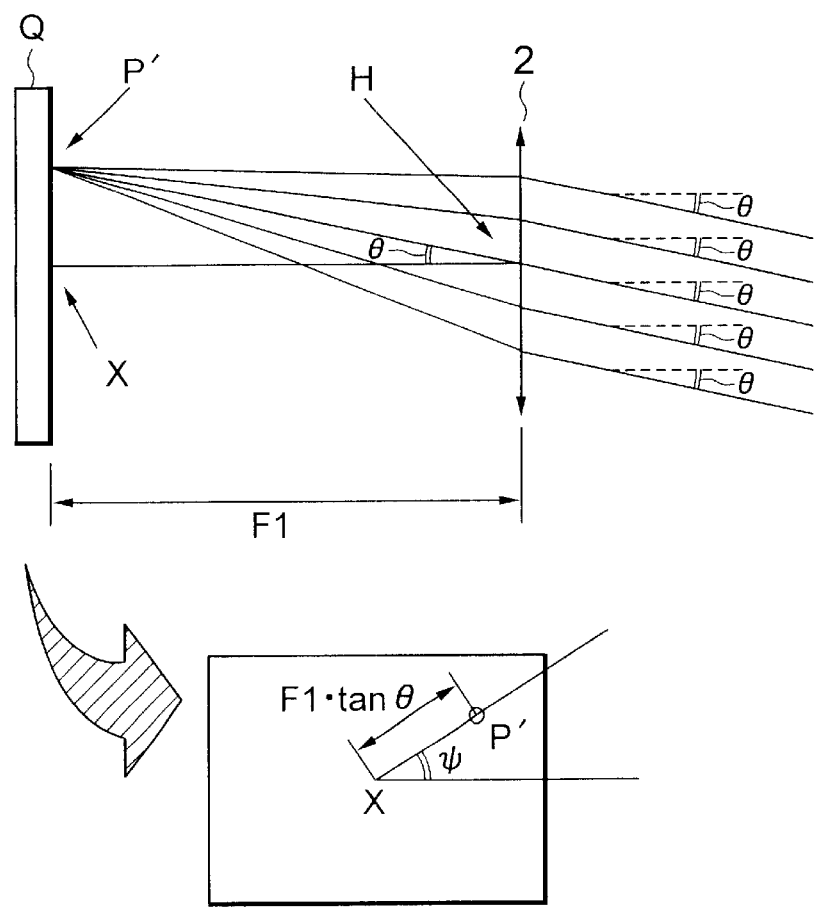
FIG. 12 is an explanatory diagram showing the tilt detected by the light pat deviation detecting apparatus according to the second aspect of the present invention.

Embodiment of the present invention will hereinafter be described with reference to the accompanying drawings.
First Embodiment FIG. 1 is a diagram showing an architecture of a first embodiment of the present invention. Note that the same components as those in the prior art shown in FIG. 7 explained above are marked with the same reference numerals and illustrated in FIG. 1, and their repetitive explanations are herein omitted.

Referring to FIG. 1, a half-mirror 51 is disposed in a laser introduction system 61 provided between a light source 11 and a beam expander 12. A half-mirror 52 is disposed in a reflecting direction of the half-mirror 51. A photoelectric detecting device 53 is disposed spaced a light path length L1 away from the half-mirror 52 in a transmitting direction of this half-mirror 52. On the other hand, a photoelectric detecting device 54 is disposed spaced a light path length L2 away from the half-mirror 52 in a reflecting direction of this half-mirror 52. These photoelectric detecting devices 53, 54 may involve the use of devices capable of detecting a light receiving position such as an imaging device, a PSD (Position Sensing Detector) and a 4-divided diode.

Detection outputs of those photoelectric detecting devices 53, 54 are inputted to a CPU 26 via an A/D converter 55. The CPU 26, based on the detection outputs of the two photoelectric detecting devices 53, 54, detects a light receiving position on each light receiving surface. The CPU 26 executes processing operations (such as correcting a mirror image on the side of, e.g., the photoelectric detecting device 54, and correcting a deviation quantity due to an angle of setting the half-mirror 52 and an angle of setting the light receiving surface) with respect to the light receiving positions thereof. The respective photoelectric detecting devices 53, 54 receive laser beams through the half-mirrors 51 and 52, as described in the above paragraph. As the premise for this, corrections are made to the origins so that the positions at which the detecting devices 53 and 54 receive the respective laser beams correspond to the state where the apparatus, inclusive of the laser source 11, is assembled in the optimal state. Such corrections on the origins correspond to "correcting a mirror image . . . ," or "correcting a deviation quantity . . . ," respectively. The CPU 26 graphically displays the thus processed light receiving position in enlargement on a display 27.

Figure 2A:
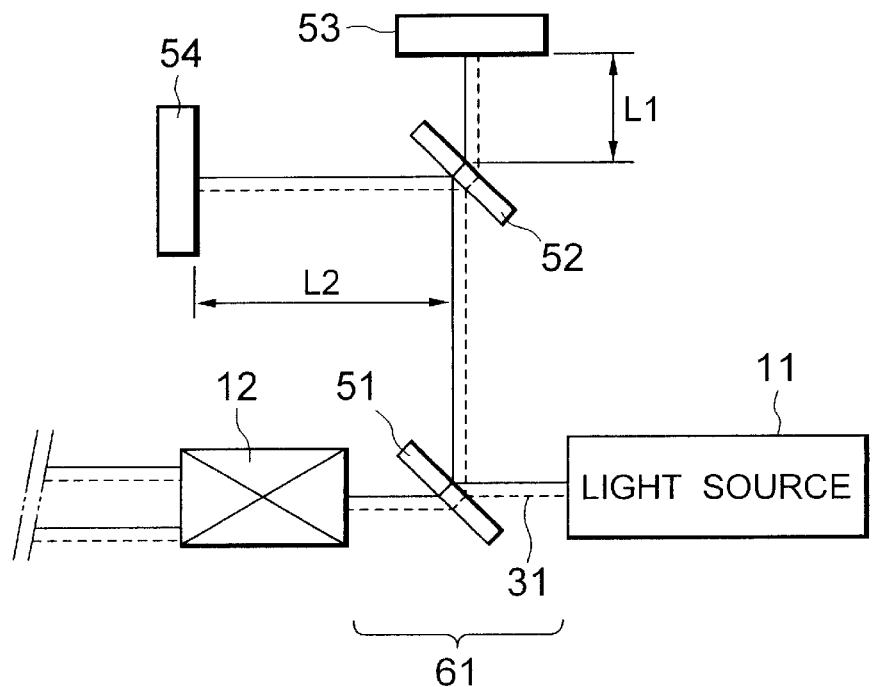
FIG. 2A is an explanatory diagram showing an operation of detecting a shift as a light path deviation in the first embodiment.
Figure 2B:
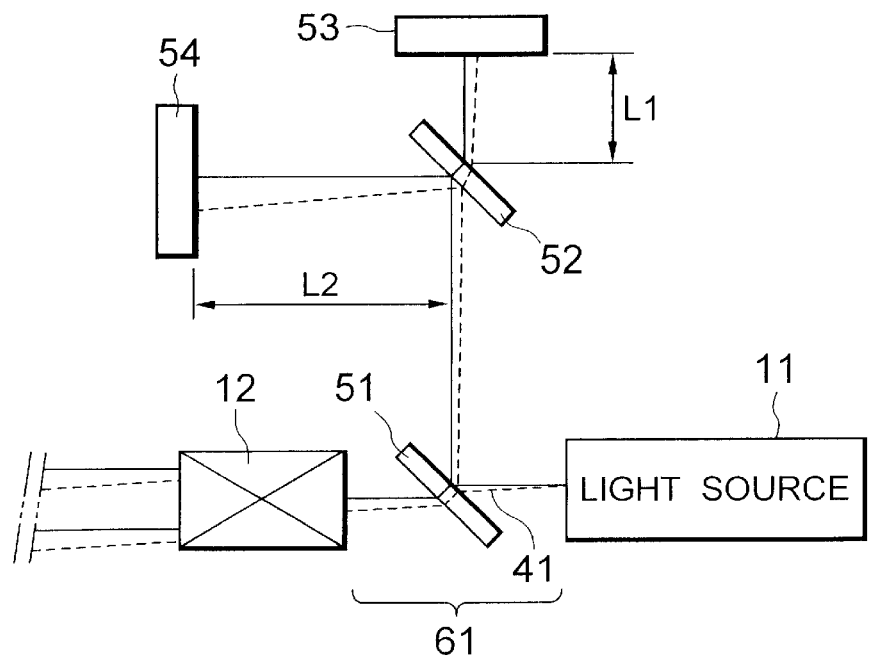
FIG. 2B is an explanatory diagram showing an operation of detecting a tilt as a light path deviation.

FIGS. 2A and 2B are explanatory diagrams each showing an operation of detecting a deviation of the light path in the first embodiment. The operation of detecting the deviation of the light path will be explained referring to FIGS. 2A and 2B.

To start with, a state where only a shift occurs on an illumination light path of the light source 11, is indicated by a dotted line in FIG. 2A. As shown in FIG. 2A, each light receiving position of each diverging destination similarly shifts. As a result, the respective light receiving positions are displayed in coincidence on the display 27. In this case, the operator corrects the shift of the illumination light path by moving the light source 11 in parallel so that each of the light receiving positions on the display 27 becomes coincident with an origin.

On the other hand, a state where a tilt occurs on the illumination light path of the light source 11, is indicated by a dotted line in FIG. 2B. In this case, a deviation occurs between the respective light receiving positions due to a difference in the light path length between the photoelectric detecting devices 53 and 54. As a consequence, the respective light receiving positions are displayed in deviation on the display 27. The operator can correct the tilt on the illumination light path by correcting an exit angle from the light source 11 so that the respective light receiving positions on the display 27 may become coincident. Note that if the shift remains as it is after correcting the tilt as described above, the operator executes the operation of correcting the shift described above.

As discussed above, in the first embodiment, the tilt and the shift of the illumination light path can be detected with a clear distinction on the basis of how the light receiving positions are displayed on the display. Further, it is also feasible to properly correct the tilt and the shift of the illumination light path with reference to the light receiving positions displayed on the display 27.

Second Embodiment

Next, a second embodiment will be discussed.

Figure 3:
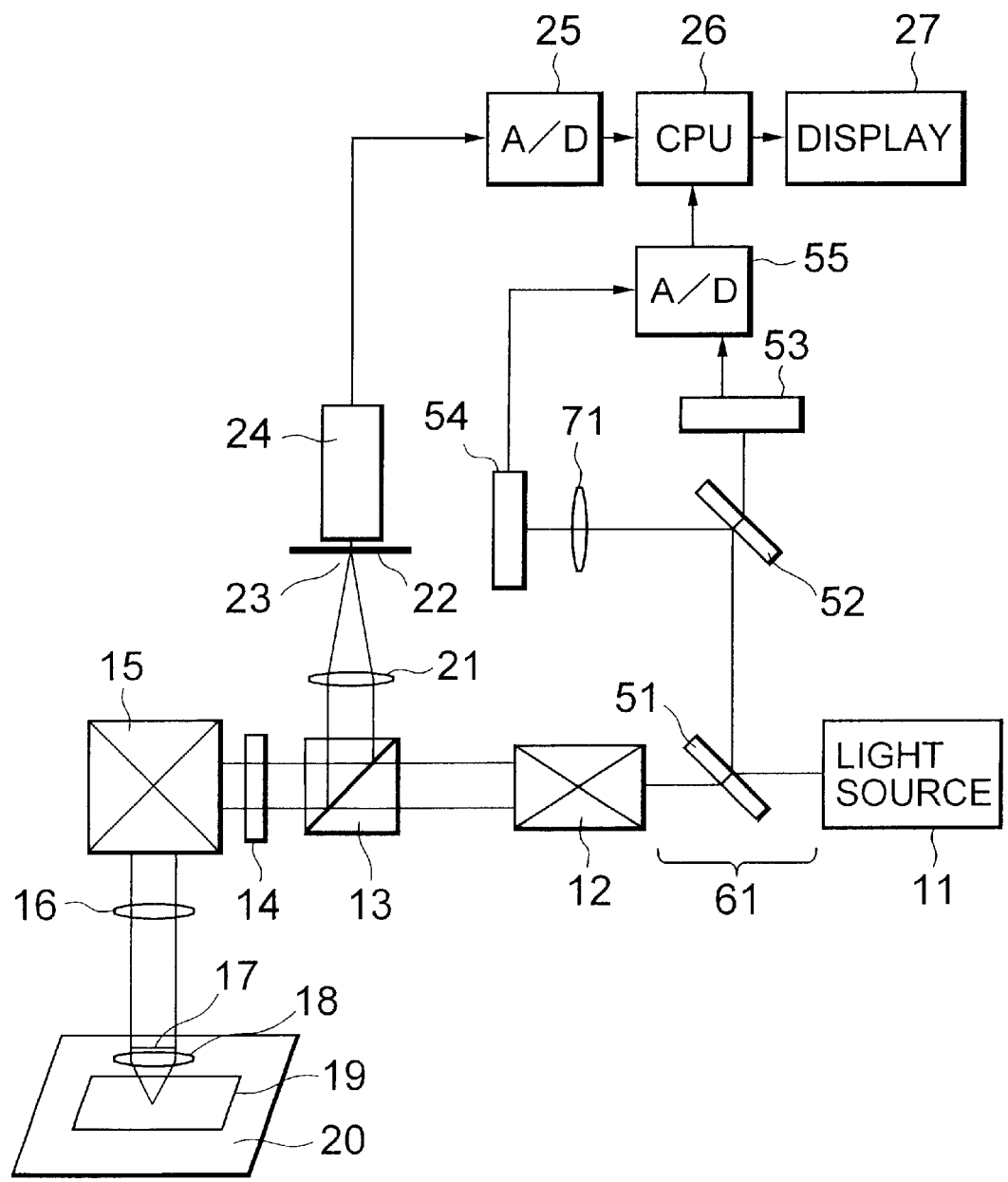
FIG. 3 is a diagram showing an architecture in a second embodiment of the present invention.

FIG. 3 a diagram showing an architecture of a second embodiment of the present invention. Note that the same components as those in the prior art shown in FIG. 7 explained above are marked with the same reference numerals and illustrated in FIG. 3, and their repetitive explanations are herein omitted.

Referring to FIG. 3, the half-mirror 51 is disposed in the laser introduction system 61 provided between the light source 11 and the beam expander 12. The half-mirror 52 is disposed in the reflecting direction of the half-mirror 51. The photoelectric detecting device 53 is disposed in the light transmitting direction of this half-mirror 52. On the other hand, the photoelectric detecting device 54 is disposed through an image forming lens 71 in the reflecting direction of this half-mirror 52. This image forming lens 71 converges parallel light beam with no occurrence of tilt at a predetermined position (e.g., the center on the light receiving surface) on the light receiving surface.

The detection outputs of those photoelectric detecting devices 53, 54 are inputted to the CPU 26 via the A/D converter 55. The CPU 26, based on the detection outputs of the two photoelectric detecting devices 53, 54, detects the light receiving position on each light receiving surface. The CPU 26 graphically displays these light receiving positions in enlargement on the display 27.

Figure 4A:
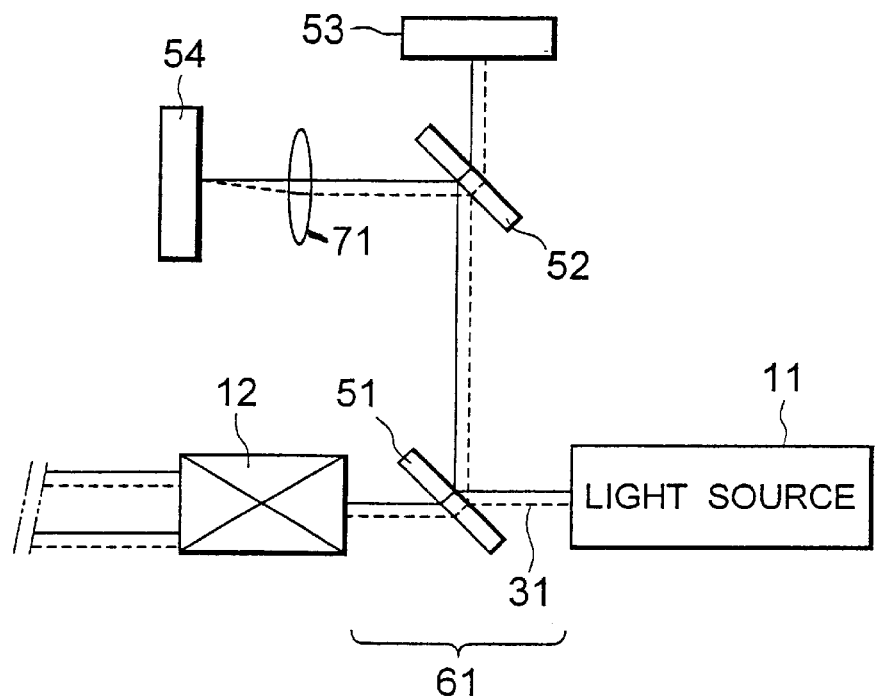
FIG. 4A is an explanatory diagram showing the operation of detecting the shift as a light path deviation in the second embodiment.
Figure 4B:
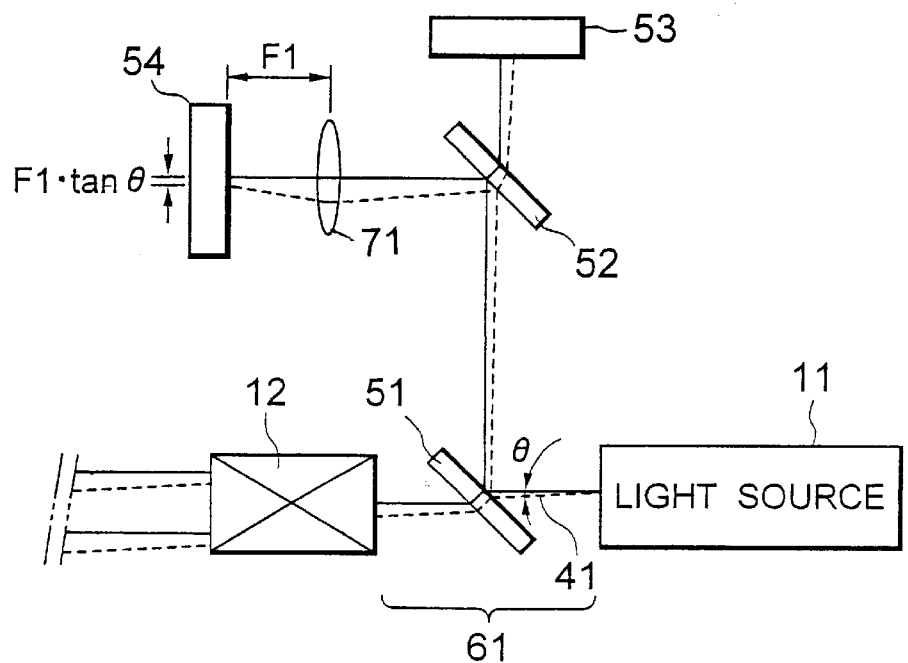
FIG. 4B is an explanatory diagram showing the operation of detecting the tilt as a light path deviation.

FIGS. 4A and 4B are explanatory diagrams each showing an operation of detecting the deviation of the light path in the second embodiment. The operation of detecting the deviation of the light path will be described referring to FIGS. 4A and 4B.

To begin with, a state where only the shift occurs on the illumination light path of the light source 11, is indicated by a dotted line in FIG. 4A. In this case, the image forming lens 71 converges the parallel light beam, by which converging action the light receiving position of the photoelectric detecting device 54 comes to a predetermined position. If the light receiving position thus becomes coincident with the predetermined position, the operator may judge that the tilt does not occur on the illumination light path. In this state, the operator corrects the shift of the illumination light path by moving the light source 11 in parallel so that the light receiving position of the other photoelectric detecting device 53 may become coincident with the origin and so on.

On the other hand, a state where the tilt occurs on the illumination light path of the light source 11, is indicated by a dotted line in FIG. 4B. In this case, incident light upon the image forming lens 71 is not contained in the parallel light beam with no occurrence of tilt, and hence the light receiving position of the photoelectric detecting device 54 deviates from the predetermined position. This deviation width W is given by the following formula:

$$W = F1 \cdot \tan\theta \qquad (1)$$

where F1 corresponds to a focal length of the image forming lens 71, and θ corresponds to an elevation angle of the tilt.

Herein, the operator can correct the tilt on the illumination light path by correcting an exit direction from the light source 11 and an angle of the light path so that the light receiving position of the photoelectric detecting device 54 becomes coincident with the predetermined position on the display 27.

Note that if the shift remains as it is after correcting the tilt as described above, the operator executes the operation of correcting the shift described above.

As discussed above, in the second embodiment, the tilt and the shift of the illumination light path can be detected based on how the light receiving positions are displayed on the display. Further, it is also possible to easily correct the deviation of the illumination light path by correcting the tilt and the shift of the illumination light path with reference to the light receiving positions displayed on the display 27.

Third Embodiment

Figure 5:
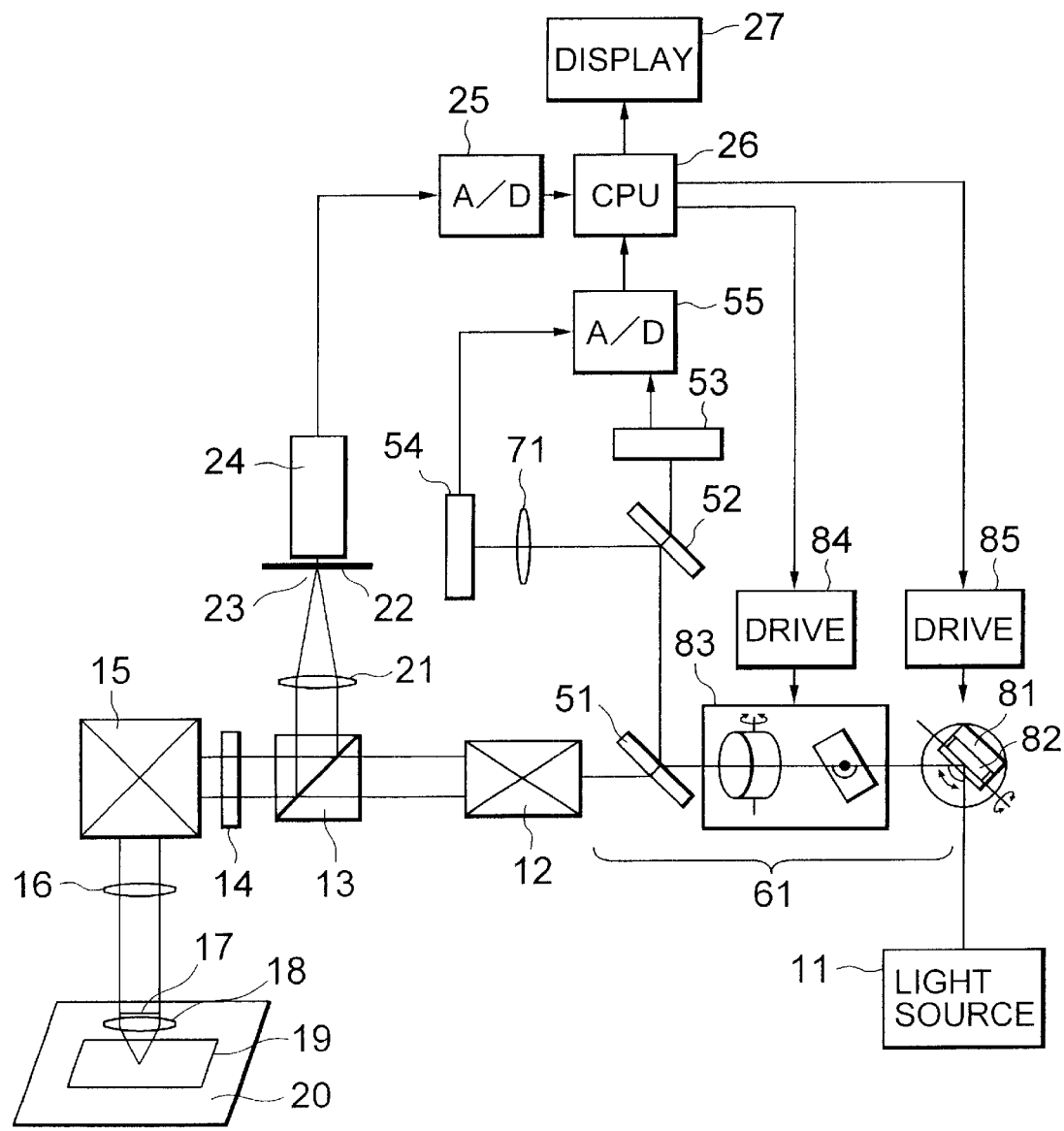
FIG. 5 is a diagram showing an architecture in a third embodiment of the present invention.

FIG. 5 is a diagram showing an architecture of a third embodiment of the present invention. Note that the same components as those in the prior art shown in FIG. 7 explained above are marked with the same reference numerals and illustrated in FIG. 5, and their repetitive explanations are herein omitted.

Referring to FIG. 5, the laser beams emitted from the light source 11 are reflected by a total reflection mirror 82 held by a mirror holder 81. This mirror holder 81 has two rotary shafts and is driven by a drive mechanism 85.

The laser beam reflected by the total reflection mirror 82 enters an incident position shifter 83. This incident position shifter 83 is constructed of two pieces of electric halving plates rotating in the orthogonal directions. The drive mechanism 84 controls the drive of this incident position shifter 83, thereby shifting the light path of the laser beams in parallel.

The half-mirror 51 is disposed between this incident position shifter 83 and the beam expander 12. The half-mirror 52 is disposed in the reflecting direction of the half-mirror 51. The photoelectric detecting device 53 is disposed in the light transmitting direction of this half-mirror 52. On the other hand, the photoelectric detecting device 54 is disposed through the image forming lens 71 in the reflecting direction of the half-mirror 52. This image forming lens 71 converges the parallel light beam with no occurrence of tilt at a predetermined position (e.g., the center on the light receiving surface) on the light receiving surface.

The detection outputs of those photoelectric detecting devices 53, 54 are inputted to the CPU 26 via the A/D converter 55. The CPU 26, based on the detection output of the photoelectric detecting device 54, calculates a deviation width and a deviation direction of the light receiving position of the photoelectric detecting device 54 from the predetermined position.

The CPU 26 informs the drive mechanism 85 of these deviation width and deviation direction. The drive mechanism 85 feedback-controls a tilt of the total reflection mirror 82 so as to cancel the deviation width and the deviation direction. As a result, the tilt of the illumination light path is automatically corrected in the total reflection mirror 82.

Next, the CPU 26, based on the detection output of the photoelectric detecting device 53, calculates as two-dimensional coordinates the shift between the light receiving position of the photoelectric detecting device 53 and the origin.

The CPU 26 informs the drive mechanism 84 of this shift. The drive mechanism 84 feedback-controls the shift of the incident position shifter 83 so as to cancel this shift. As a result, the shift of the illumination light path is automatically corrected through the incident position shifter 83.

As discussed above, in the third embodiment, the deviation of the illumination light path in a confocal microscope can be automatically corrected. Accordingly, the confocal microscope that is maintenance free and exhibits a high reliability, is actualized.

It is preferable that if the light source 11 is capable of switching the wavelength, the CPU 26 (control means) executes the control of correcting the deviation of the light path, which is triggered by switching the wavelength. In this case, it is possible to automatically properly correct the deviation of the illumination light path with the switchover of the wavelength.

Fourth Embodiment

Figure 6:
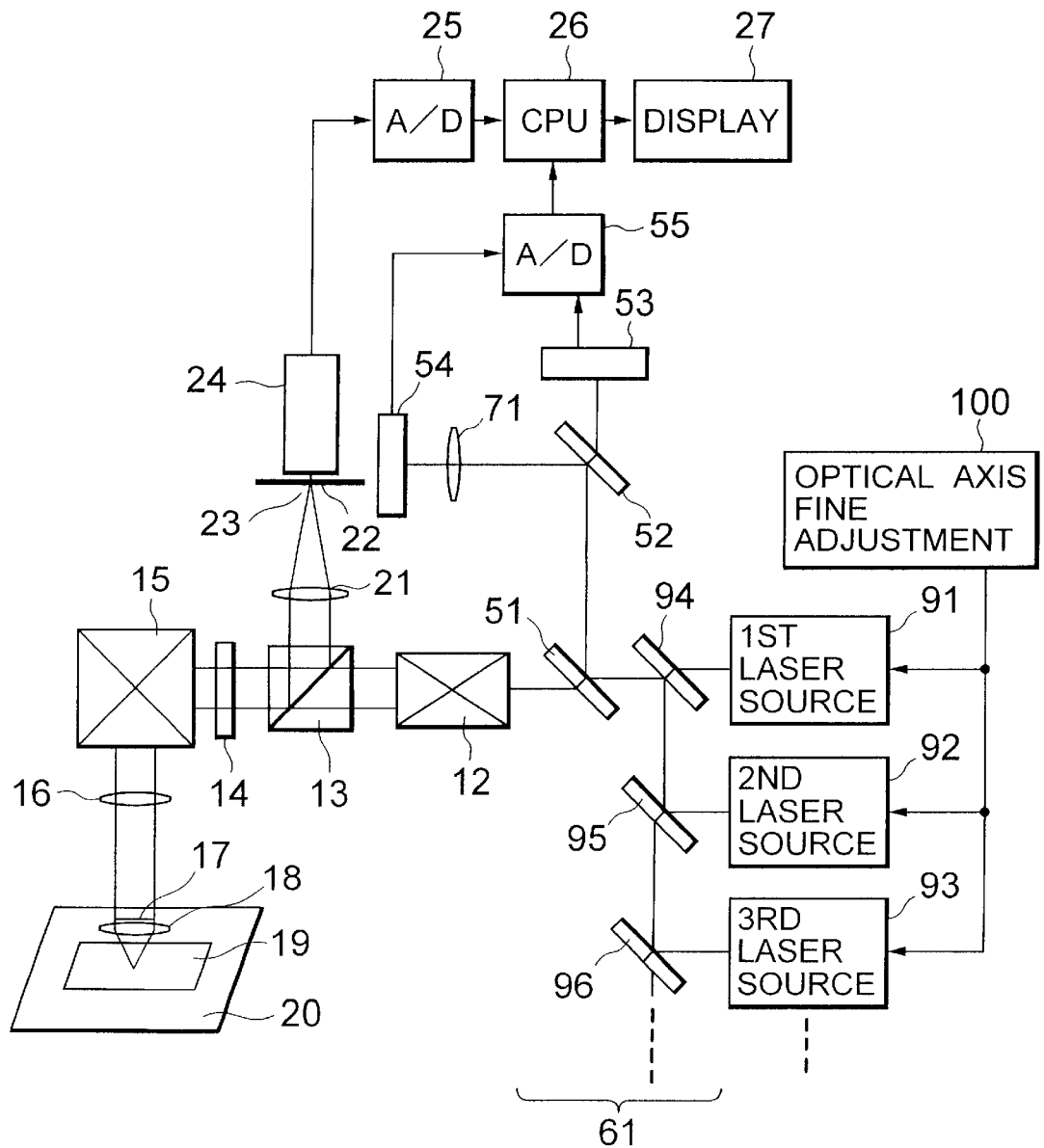
FIG. 6 is a diagram showing an architecture in a fourth embodiment of the present invention.

FIG. 6 is a diagram showing an architecture of a fourth embodiment of the present invention. Note that the same components as those in the second embodiment shown in FIG. 3 explained above are marked with the same reference numerals and illustrated in FIG. 6, and their repetitive explanations are herein omitted.

According to the fourth embodiment, there are provided a plurality of light sources such as a first laser light source 91, a second laser light source 92 and a third laser light source 93. The laser beams emitted from the plurality of laser light sources 91–93 are reflected selectively of the wavelength through dichroic mirrors 94–96, and travel on along a common illumination light path. The half-mirror 51 for taking some of the laser beams is disposed on this common illumination light path.

Further, exit positions and exit angles from the plurality of laser light sources 91–93 are individually adjusted by an optical axis fine adjustment mechanism 100.

In this construction, a single unit of light path deviation detecting apparatus is capable of similarly detecting the deviations of the light paths of the plurality of light sources. Further, the light paths of the plurality of light sources can be easily set on the same optical axis by controlling the optical axis fine adjustment mechanism 100 while referring to what is displayed on the display 27.

Fifth Embodiment

Figure 13:
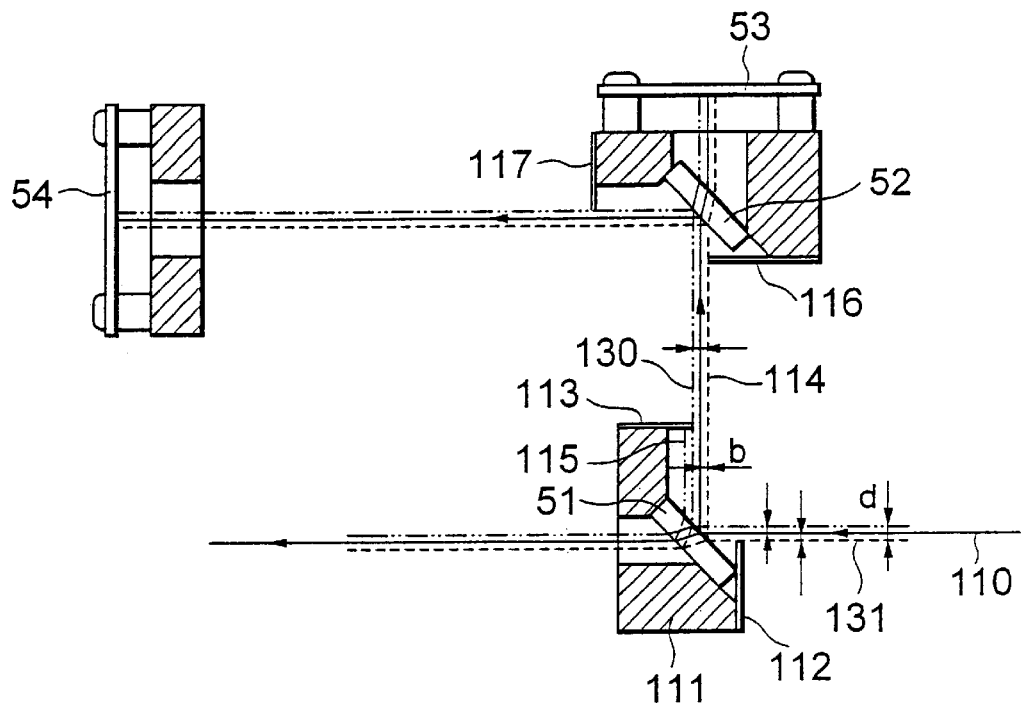
FIG. 13 is a diagram showing an architecture in a fifth embodiment of the present invention.

FIG. 13 is a diagram showing a configuration of the light path deviation detecting apparatus in a fifth embodiment of the present invention. Note that the whole architecture of the confocal microscope is common to those in the embodiments illustrated in FIGS. 1, 3, 5 and 6 and discussed above, and therefore its explanation is herein omitted.

The half-mirror 51 fixed onto a base 111 is disposed in its as-fixed state in the laser introduction system of the confocal microscope in order to take the light on a detection target light path. Two pieces of light shielding plates 112, 113 are fixed onto the base 111. The photoelectric detecting devices 53, 54 are respectively disposed through the half-mirror 52 in the reflecting direction of this half-mirror 51.

The layout of this light shielding plate 113 is determined by the following steps:

① At first, the deviser of the present apparatus obtains, in a state where there is no deviation of the detection target light path (laser beam 110), a deviation (indicated by b in FIG. 13) of the light path between a beam of front surface reflected light 114 and a beam of rear surface reflected light 115 of the half-mirror 51. This deviation of the light path can be obtained arithmetically from, e.g., a thickness and a refractive index of the half-mirror.

② Next, the same deviser places the light shielding plate 113 on the side of cutting off the rear surface reflected light 115 defined as stray reflected light, and positions the edge of the light shielding plate 113 so that a passing boundary of the reflected light may be within the light path deviation b (preferably at the middle point thereof).

on the other hand, a layout relationship of the light shielding plate 112 is determined by the following steps:

① The deviser assumes a beam of rear surface reflected light 130 cut off at the very limit by the edge (the passing boundary of the reflected light) of the light shielding plate 113. The deviser obtains a beam of incident light 131 for generating the rear surface reflected light 130.

② The deviser positions the edge of the light shielding plate 112 so that this beam of incident light 131 serves as the passing boundary.

With the configurations described above, only the light incident within the range d shown in FIG. 13 is not cut off by the light shielding plates 112, 113 and transmitted as a normal beam of front surface reflected light towards the half-mirror 52. At this time, the rear surface reflected light generated by the incident light within the range d is certainly cut off by the light shielding plate 113. Further, the incident range is restricted beforehand by the light shielding plate 112, whereby the rear surface reflected light does not enter at all the passing range of the normal front surface reflected light.

Thus, the rear surface reflected light can be surely hindered by providing the light shielding plates 112, 113.

Note that light shielding plates 116, 117 are similarly provided on the side of the half-mirror 52 in the fifth embodiment. As a result, the rear surface reflected light generated by the half-mirror 52 can be also certainly hindered.

Figure 15A:
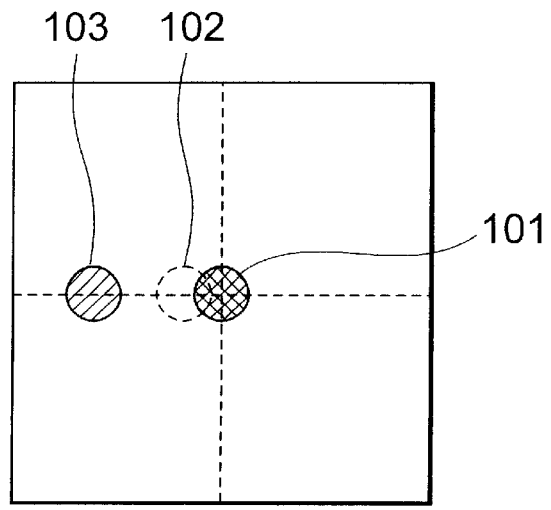
FIG. 15A is an explanatory diagram showing a half-mirror stray light removing effect of a half-mirror in a state where neither a light shielding plate nor a light shielding mask is provided.
Figure 15B:
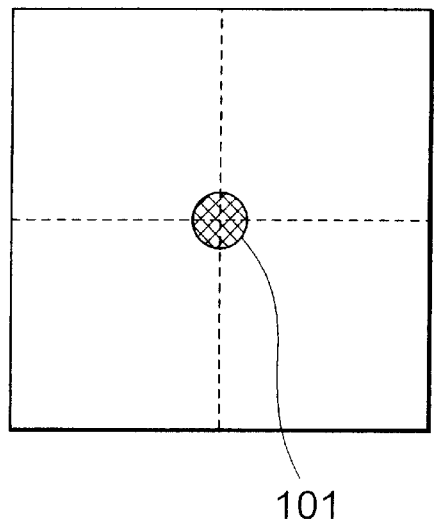
FIG. 15B is an explanatory diagram showing the half-mirror stray light removing effect of the half-mirror in a state where the light shielding plate or the light shielding mask is provided.

As discussed above, the stray light (that is herein the rear surface reflected light) is surely hindered in the half-mirrors 51, 52, so that a false spot image (indicated by 103 in FIG. 15A) is not formed at all, and only a normal spot image 101 is obtained (see FIG. 15b). As is clear to those skilled in the art, the reference numeral 102 denotes an apparent gravity center of the spot image. Then, a detection accuracy of the light path deviation detecting apparatus can be enhanced.

Sixth Embodiment

Figure 14:
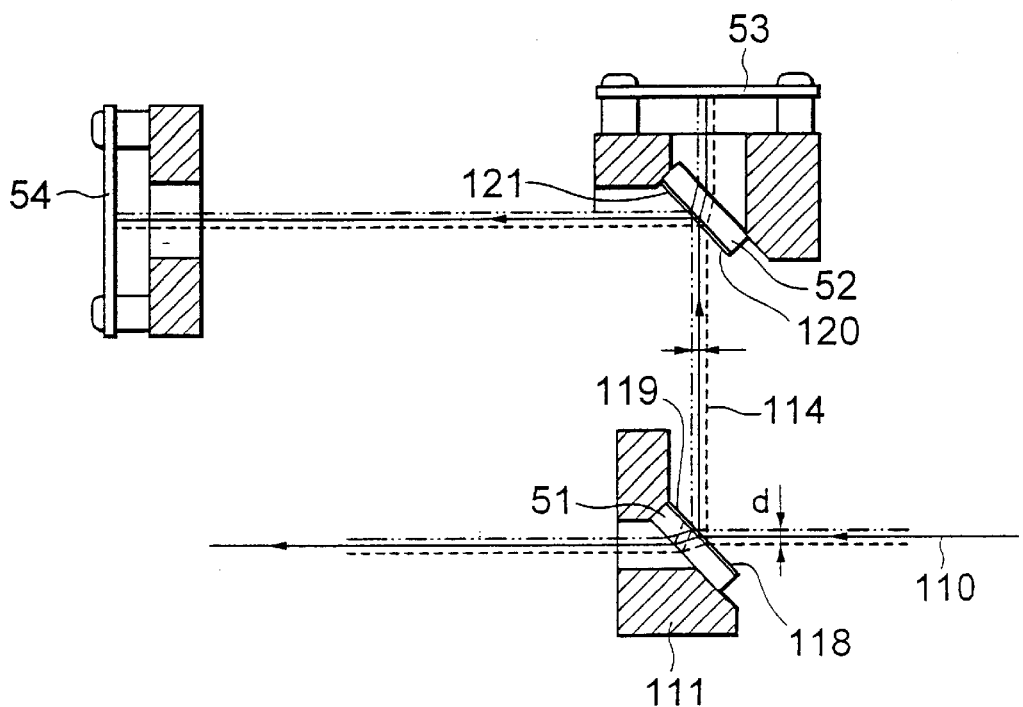
FIG. 14 is a diagram showing an architecture in a sixth embodiment of the present invention.

FIG. 14 is a diagram showing a configuration of the light path deviation detecting apparatus in a sixth embodiment of the present invention. Note that the whole architecture of the confocal microscope is common to those in the embodiments illustrated in FIGS. 1, 3, 5 and 6 and discussed above, and therefore its explanation is herein omitted.

A different point in terms of the configuration between the firth embodiment discussed above and the sixth embodiment is that light shielding masks 118, 119 as substitutes for the light shielding plates 112, 113 are provided covering the mirror surface of the half-mirror 51. The light shielding masks 118, 119 may be formed by pasting a light shielding material to the mirror surface, or applying a coating exhibiting the light shielding property, or forming an optical thin film having the light shielding property on the mirror surface. Further, the mask surfaces may be formed with rugged portions so that the light shielding masks 118, 119 each function as a sort of optical trap.

The layout of this light shielding mask 119 is determined by the same steps as in the case of the light shielding plate 113 except that the mirror surface is covered. Moreover, the layout of the light shielding mask 118 is determined by the same steps as in the case of the light shielding plate 112.

With the configuration described above, only the incident light within the range d shown in FIG. 14 is not cut off by the light shielding mask 118, 119, and transmitted as the normal surface reflected light towards the half-mirror 52. At this time, the rear surface reflected light generated by the incident light within the range d is surely cut off by the rear surface of the light shielding mask 119. Further, the incident range is restricted by the surface of the light shielding mask 118, and hence there does not occur such a beam of rear surface reflected light as to enter the passing range of the normal surface reflected light.

Thus, the rear surface reflected light can be certainly hindered by providing the light shielding masks 118, 119, respectively.

It is to be noted that light shielding masks 120, 121 are similarly provided on the side of the half-mirror 52 in the sixth embodiment. As a result, the rear surface reflected light generated by the half-mirror 52 can be also certainly hindered.

As discussed above, the stray light (that is herein the rear surface reflected light) is surely hindered in the half-mirrors 51, 52, so that a false spot image is not formed at all (see FIG. 15b), and the detection accuracy of the light path deviation detecting apparatus can be enhanced.

Supplementary Items of Embodiments

Note that the light path deviation detecting apparatus corresponding to the second aspect of the present invention is provided in the third and fourth embodiments discussed above, however, the present invention is not limited to this. As a matter of course, the light path deviation detecting apparatus according to the first aspect of the present invention may also be provided as a substitute.

Note that the light path is diverted by the half-mirror 52 after taking the detection target light by the half-mirror 51 in the first through fourth embodiments discussed above. This kind of light path design has an advantage of requiring a small number of optical elements additionally disposed on the detection target light path and disposing these elements in even a narrow space on the side of the detection target light path. The present invention is not, however, limited to this light path design. For instance, the half-mirrors are disposed at different two points on the detection target light path, whereby the two diverging light paths may be formed stepwise.

Further, in accordance with the first and second embodiments discussed above, the light receiving positions are detected by the photoelectric detecting devices 53, 54 and graphically displayed in enlargement on the display 27. This mode has an advantage in which the deviations (the shift and the tilt) of the detection target light path can be visually easily displayed. The present invention is not, however, confined to this mode. For example, the CPU 26 calculates the shift and the tilt from the results of detecting the light receiving positions, and may also be displayed with a distinction therebetween in the form of a bar graph, or a pictorial display or numerical values on the display 27. Moreover, there may be provided a monitor module for judging an abnormal state of the deviation of the light path on the basis of the results of detecting the light receiving positions, and emitting an alarm.

Thus, what may be added to the light path deviation detecting apparatus according to the first aspect of the present invention, is a detecting module (of which a preferable specific example is any one of the display unit such as the display 27, the unit for calculating the shift and the tilt, and the light path deviation monitor module) capable of detecting the tilt of the detection target light path from the difference between the light receiving positions detected respectively by the light detecting devices, and detecting the shift of the detection target light path from a common element between the light receiving positions after removing the above difference. In this case, the above contrivance makes it by far easier for the operator to execute the operation of detecting the light path deviation, as well as making it possible to expand the application of the light path deviation detecting apparatus.

Further, what may be added to the light path deviation detecting apparatus according to the second aspect of the present invention, is a detecting module (of which a preferable specific example is any one of the display unit such as the display 27, the unit for calculating the shift and the tilt, and the light path deviation monitor module) capable of detecting the tilt of the detection target light path from the deviation of the light receiving position at the diverging destination provided with a light converging element from a predetermined position, detecting the shift of the detection target light path by removing the tilt from a light receiving position at the other diverging destination. In this case also, the above contrivance makes it by far easier for the operator to execute the operation of detecting the light path deviation, as well as making it possible to expand the application of the light path deviation detecting apparatus.

Note that the light path deviation detecting apparatus corresponding to the first aspect of the present invention is provided with the contrivance against the stray light in the fifth and sixth embodiments discussed above, however, the present invention is not restricted to this contrivance. As a matter of course, the same contrivance against the stray light may also be provided in the light path deviation detecting apparatus according to the second aspect of the present invention.

Moreover, the half-mirror 52 is also provided with the light shielding plate or the light shielding mask in the fifth and sixth embodiment discussed above. The half-mirror 52 is however, disposed on the secondary light path and is therefore by far smaller in degree of occurrence of the stray light than the half-mirror 51 disposed directly on the detection target light path. Hence, if the stray light generated in the half-mirror 52 is small enough, the half-mirror may omit the contrivance against the stray light.

Note that it is preferable to use a light shielding material and a light shielding coating of which light shielding performances do not depend on a polarizing direction and a wavelength as materials of the light shielding plates 112, 113 and of the light shielding masks 118, 119 in the fifth and sixth embodiment discussed above. In this case, even when a plurality of light sources having different polarizing directions and wavelengths are exchangeably used, it is feasible to obtain the same degree of stray light removing performance with a stability.

Further, the fifth and sixth embodiments discussed above have exemplified the contrivance against the stray light of the light path deviation detecting apparatus and the confocal microscope. By the way, if this kind of contrivance against the stray light is carried out in a general optical device having the half-mirror, the following geometry may be taken.

To be specific, the optical device may include at least one half-mirror within the optical device, and a reflection restricting element for hindering the stray reflected light outside the boundary, wherein the passing boundary of the reflected light is set in a "light path deviation between the normal reflected light and the stray reflected light" that occurs due to a thickness and a refractive index of the half-mirror. This optical device may further include an incidence restricting element for hindering the stray reflected light generated in the half-mirror from entering the passing range of the normal reflected light by restricting the passing range of the incident light on the half-mirror. What is applied as preferable specific examples of these reflection restriction element and incidence restricting element, may be the light shielding plates 112, 113 and the light shielding masks 118, 119 in the fifth and sixth embodiments discussed above.

In the light path deviation detecting apparatus according to the first aspect of the present invention, the light receiving surfaces are disposed in the positions with the different lengths of the light paths, and the light receiving positions are detected on the respective light receiving surfaces. The tilt of the detection target light path can be detected based on the difference between the thus detected light receiving positions. Further, the shift of the detection target light path can be detected based on the common element of the light receiving positions.

In the light path deviation detecting apparatus according to the second aspect of the present invention, the shift of the detection target light is optically canceled through the light converging element. Accordingly, the tilt of the detection target light path can be detected directly from the light receiving position on the light receiving surface provided with the light converging element. Moreover, the shift of the detection target light path can be also detected by removing the tilt component from the light receiving position on other light receiving surface.

In the light path deviation detecting apparatus according to the third aspect of the present invention, the stray light occurred at the diverging element is hindered by the stray light hindering element, whereby the accuracy of detecting the light path deviation can be enhanced.

In the light path deviation detecting apparatus according to the fourth aspect of the present invention, the stray reflected light of the half-mirror can be surely hindered by providing the incidence restricting element and the reflection restricting element.

In the light path deviation detecting apparatus according to the fifth aspect of the present invention, the stray reflected light of the half-mirror can be surely hindered by use of the front surface and the rear surface of the light shielding mask.

In the light path deviation detecting apparatus according to the sixth aspect of the present invention, the passing boundary of the reflected light is set within the light path deviation between the normal reflected light in the half-mirror and the stray reflected light therein. As a result, only the stray reflected light can be selectively hindered.

In the confocal microscope according to the seventh aspect of the present invention, the light path deviation detecting apparatus is provided on the illumination light path, whereby the main factor (which is the deviation of the illumination light path) to cause a decline of performance of the confocal microscope can be certainly detected. Further, the operation of calibrating the confocal microscope can be facilitated by making use of the result of the detection of the light path deviation detecting apparatus.

In the confocal microscope according to the eighth aspect of the present invention, the tilt control device and the shift control device automatically correct the deviations of the illumination light path on the basis of the detected result of the light path deviation detecting apparatus. Accordingly, the highly-reliable confocal microscope with a variety of stabilized performances such as an image resolution and an image quality, is actualized.

In the confocal microscope according to the ninth aspect of the present invention, the light path deviation detecting apparatus is disposed on the illumination light path common to the plurality of light sources. It is therefore feasible for the single unit of light path deviation detecting apparatus to detect the light path deviation of each of the light sources. Moreover, the calibrating device is provided, and hence the light paths of the plurality of light sources can be easily adjusted on the same optical axis while referring to the result of detecting the light path deviation of each light source.

What is claimed is:

1. A light path deviation detecting apparatus for detecting a deviation of a detection target light path coming incident from a light source, comprising:

diverging means for diverging the detection target light path coming incident from the light source into at least two light paths; and light detecting means, of which light receiving surfaces are disposed spaced light path lengths different from each other from respective diverging destinations of said diverging means, for detecting respectively light receiving positions on the light receiving surfaces, wherein said light detecting means detects a tilt of the detection target light path coming incident from the light source from a difference between the light receiving positions detected respectively by said light detecting means, and detects a shift of the detection target light path coming incident from the light source from a common component between the light receiving positions after removing the difference.

2. A light path deviation detecting apparatus for detecting a deviation of a detection target light path coming incident from a light source, comprising:

diverging means for diverging the detection target light path coming incident from the light source into at least two light paths; and light detecting means, of which light receiving surfaces are disposed spaced light path lengths different from each other from respective diverging destinations of said diverging means, for detecting respectively light receiving positions on the light receiving surfaces, wherein said light detecting means detects a tilt of the detection target light path coming incident from the light source from a difference between the light receiving positions detected respectively by said light detecting means, and detects a shift of the detection target light path coming incident from the light source from a common component between the light receiving positions after removing the difference, and wherein said diverging means includes stray light hindering means for hindering at least a part of stray light caused in said diverging means from reaching the light receiving surface of said light detecting means.

3. A light path deviation detecting apparatus according to claim 2, wherein said diverging means is means for taking the light from the detection target light path coming incident from the light source by use of a half-mirror obliquely provided on the detection target light path coming incident from the light source, and said stray reflected light hindering means includes:

incidence restricting means for hindering stray reflected light occurred in said half-mirror from entering a passing range of normal reflected light by restricting a passing range of incident light upon said half-mirror; and reflection restricting means for hindering the stray reflected light occurred in said half-mirror by restricting a passing range of the reflected light from said half-mirror.

4. A light path deviation detecting apparatus according to claim 2, wherein said diverging means is means for taking the light from the detection target light path coming incident from the light source by use of a half-mirror obliquely provided on the detection target light path coming incident from the light source, and said stray reflected light hindering means is constructed of a light shielding mask for masking said half-mirror, and has a front surface performing a function of hindering the stray reflected light occurred in said half-mirror from entering the passing range of the normal reflected light by restricting the passing range of the incident light upon said half-mirror, and a rear surface performing a function of hindering the stray reflected light occurred in said half-mirror by restricting the passing range of the reflected light from said half-mirror.

5. A light path deviation detecting apparatus according to claim 4, wherein said stray reflected light hindering means sets a passing boundary of the reflected light in a "light path deviation between the normal reflected light and the stray reflected light" that occurs due to a thickness and a refractive index of said half-mirror.

6. A light path deviation detecting apparatus according to claim 3, wherein said stray reflected light hindering means sets a passing boundary of the reflected light in a light path deviation between the normal reflected light and the stray reflected light that occurs due to a thickness and a refractive index of said half-mirror.

7. A confocal microscope comprising:

a light source for illumination;

an illumination optical system for irradiating a sample with the light from said light source;

an observation optical system for converging the light reflected from the sample;

a pinhole disposed in an optical conjugate position through said observation optical system to an observation point on the sample;

scanning means for optically scanning the observation point over the sample;

light receiving means for receiving the light penetrating said pinhole; and image forming means for forming an image of the sample from a relationship between a light intensity obtained from said light receiving means and the scanning operation of said scanning means, wherein said light path deviation detecting apparatus according to claim 1 is provided on an illumination light path of said illumination optical system and thus becomes capable of detecting a shift and a tilt of the illumination light path.

8. A confocal microscope according to claim 7, wherein said light source includes plural types of selectable light sources, and said light path deviation detecting apparatus is disposed on the illumination light path common to said plural types of light sources, and has calibrating means for calibrating a light path deviation between said plural types of light sources while referring to a result of detection of said light path deviation detecting apparatus.

9. A confocal microscope comprising:

a light source for illumination;

an illumination optical system for irradiating a sample with the light from said light source;

an observation optical system for converging the light reflected from the sample;

a pinhole disposed in an optical conjugate position through said observation optical system to an observation point on the sample;

scanning means for optically scanning the observation point over the sample;

light receiving means for receiving the light penetrating said pinhole;

image forming means for forming an image of the sample from a relationship between a light intensity obtained from said light receiving means and the scanning operation of said scanning means;

said light path deviation detecting apparatus according to claim 1 being provided on an illumination light path of said illumination optical system and thus becoming capable of detecting a shift and a tilt of the illumination light path;

tilt control means for automatically correcting the tilt of the illumination light path by turning the illumination light path corresponding to the tilt of the illumination light path that is detected by said light path deviation detecting apparatus; and shift control means for automatically correcting the shift of the illumination light path by moving the illumination light path in parallel corresponding to the shift of the illumination light path that is detected by said light path deviation detecting apparatus.

10. A light path deviation detecting apparatus for detecting a tilt of a detection target light path coming incident from a light source, comprising:

diverging means for diverging the detection target light path coming incident from the light source into at least two light paths; and light detecting means, of which light receiving surfaces are disposed spaced light path lengths different from each other from respective diverging destinations of said diverging means, for detecting respectively light receiving positions on the light receiving surfaces, wherein said light detecting means detects a tilt of the detection target light path coming incident from the light source from a difference between the light receiving positions detected respectively by said light detecting means.

11. A light path deviation detecting apparatus for detecting a shift of a detection target light path coming incident from the light source, comprising:

diverging means for diverging the detection target light path coming incident from the light source into at least two light paths; and light detecting means, of which light receiving surfaces are disposed spaced light path lengths different from each other from respective diverging destinations of said diverging means, for detecting respectively light receiving positions on the light receiving surfaces, wherein said light detecting means detects a difference between the light receiving positions detected respectively by said light detecting means, and detects a shift of the detection target light path coming incident from the light source from a common component between the light receiving positions after removing the difference.

12. A confocal microscope comprising:

a light source for illumination;

an illumination optical system for irradiating a sample with the light from said light source;

an observation optical system for converging the light reflected from the sample;

a pinhole disposed in an optical conjugate position through said observation optical system to an observation point on the sample;

scanning means for optically scanning the observation point over the sample;

light receiving means for receiving the light penetrating said pinhole;

image forming means for forming an image of the sample from a relationship between a light intensity obtained from said light receiving means and the scanning operation of said scanning means; and a light path deviation detecting apparatus for detecting a shift and/or a tilt of the illumination light path, light path deviation detecting apparatus comprising an optical path divider which divides the light from said light source into a first light path of the light for irradiating the sample and a second light path of the light for detecting the shift and/or the tilt of the illumination light path, a diverging device disposed in the second light path and diverges the second light path into at least two light paths;

a plurality of light detecting devices, of which light receiving surfaces are disposed spaced light path lengths different from each other from respective diverging destinations of said diverging device, for detecting respectively light receiving positions on the light receiving surfaces, and a processing unit which detects a tilt of the illumination light path from a difference between the light receiving positions detected respectively by said light detecting devices, and detects a shift of the detection target light path coming incident from the light source from a common component between the light receiving positions after removing the difference.

* * * * *